(12) United States Patent
Shippy

(10) Patent No.: US 7,596,682 B2
(45) Date of Patent: Sep. 29, 2009

(54) ARCHITECTED REGISTER FILE SYSTEM UTILIZES STATUS AND CONTROL REGISTERS TO CONTROL READ/WRITE OPERATIONS BETWEEN THREADS

(75) Inventor: David Shippy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1148 days.

(21) Appl. No.: 10/821,025

(22) Filed: Apr. 8, 2004

(65) Prior Publication Data

US 2005/0228975 A1    Oct. 13, 2005

(51) Int. Cl.
   *G06F 9/00* (2006.01)
(52) U.S. Cl. .................. 712/228; 712/229; 718/108
(58) Field of Classification Search .................. 712/228, 712/229; 718/108
   See application file for complete search history.

(56) References Cited

U.S. PATENT DOCUMENTS 5,900,025 A * 5/1999 Sollars ........................ 712/248
6,081,880 A * 6/2000 Sollars ........................ 711/202

OTHER PUBLICATIONS

Structured Computer Organization, Andrew S. Tanenbaum, 1984, Prentice-Hall, Inc., 2nd Edition, pp. 10-11.*

* cited by examiner

*Primary Examiner*—Alford W Kindred
*Assistant Examiner*—Benjamin P Geib
(74) *Attorney, Agent, or Firm*—Stephen R. Tkacs; Stephen J. Walder, Jr.; Matthew B. Talpis

(57) ABSTRACT

An apparatus, a method, and a computer program are provided for an architected register file system for multithread system. In conventional architected register file systems, a thread is only capable of utilizing a single register file. However, when register files of other thread are unused, the system resources are wasted. In the modified architected register file system, though, threads are enabled to utilize register files of other threads. The utilization of other thread registers is through the use of control fields added to a Status and Control Register (SCR) associated with each register file that enable and disable usage of other register files.

15 Claims, 3 Drawing Sheets

ARCHITECTED REGISTER FILE SYSTEM UTILIZES STATUS AND CONTROL REGISTERS TO CONTROL READ/WRITE OPERATIONS BETWEEN THREADS

FIELD OF THE INVENTION

The present invention relates generally to the multi-thread processor architecture and, more particularly, to the operation of architected registers.

DESCRIPTION OF THE RELATED ART

Over recent years, conventional microprocessor design has been moving toward the increased use of hardware multi-thread designs. For example, each process can be allocated a certain time slice for utilization of the processor. The software and hardware, though, utilized to implement hardware multi-thread processes can be quite complicated. For example, there can be multiple layers of memory and so forth that complicate the actual implementation.

Hardware multithreading provides the capability to improve overall system performance. Typical implementations of hardware multithreads provide a two way multiprocessor with shared data flow. In these implementations hardware multithreading provides the capability for a given thread to utilize idle slots in the other execution streams of other threads. It provides the capability for a given thread to utilize idle slots in the other execution streams of other threads. Therefore, the overall throughput of the processor can be improved.

Typically, whenever a hardware multi-thread system is implemented, a scratch pad memory or architected register space is utilized for each thread. For example, in the PowerPC® Instruction Set Architecture, several register files are including such as: a 32 entry General Purpose Register (GPR), a 32 entry Floating Point Register (FPR), a 32 entry Vector Register file (VRF), as well as other registers. The PowerPC® is available from the International Business Machines Corp., Old Orchard Road Armonk, N.Y. 10504. However, each of the 32 entry register files is specifically for a single thread. If a hardware multi-thread system is employed, then there is a 32 entry register file for each thread. Hence, each thread has its own set architected register space.

A problem with most modern high frequency microprocessors that utilize hardware multi-thread systems is the length of the pipelines for instructions. Pipelines are hardware mechanisms to break a problem up into smaller elements. These pipeline lengths are to allow for higher frequency of a microprocessor. As pipelines become deeper, more architected registers are required. However, architected register space for a particular thread typical remains static. In other words, each thread is only capable of utilizing its own architected register space.

Static architected register space, though, can be a waste of valuable computer resources. Considering that each thread in a hardware multi-thread system has its own predefined register set, at any given time one thread may not be operational. In cases where a thread is not operational, the resources, such as the architected register space is wasted because it is not utilized.

Therefore, there is a need for a method and/or apparatus for better utilizing the capabilities of a hardware multi-thread system without significantly modifying the instruction set that addresses at least some of the problems associated with conventional hardware multi-thread systems.

SUMMARY OF THE INVENTION

The present invention provides a method, an apparatus, and a computer program for an architected register file system that utilizes a plurality of threads. Included in the architected register file system is a plurality of register files, where each register file corresponds to one thread. Associated with the register files is a plurality of Status and Control Registers (SCR), where each SCR corresponds to one register file. Also, a plurality of control bit sets is provided, where each control bit set corresponds to one SCR. Each control bit set is configured to allow a thread associated with an associated SCR to utilize other register files associated with other threads.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
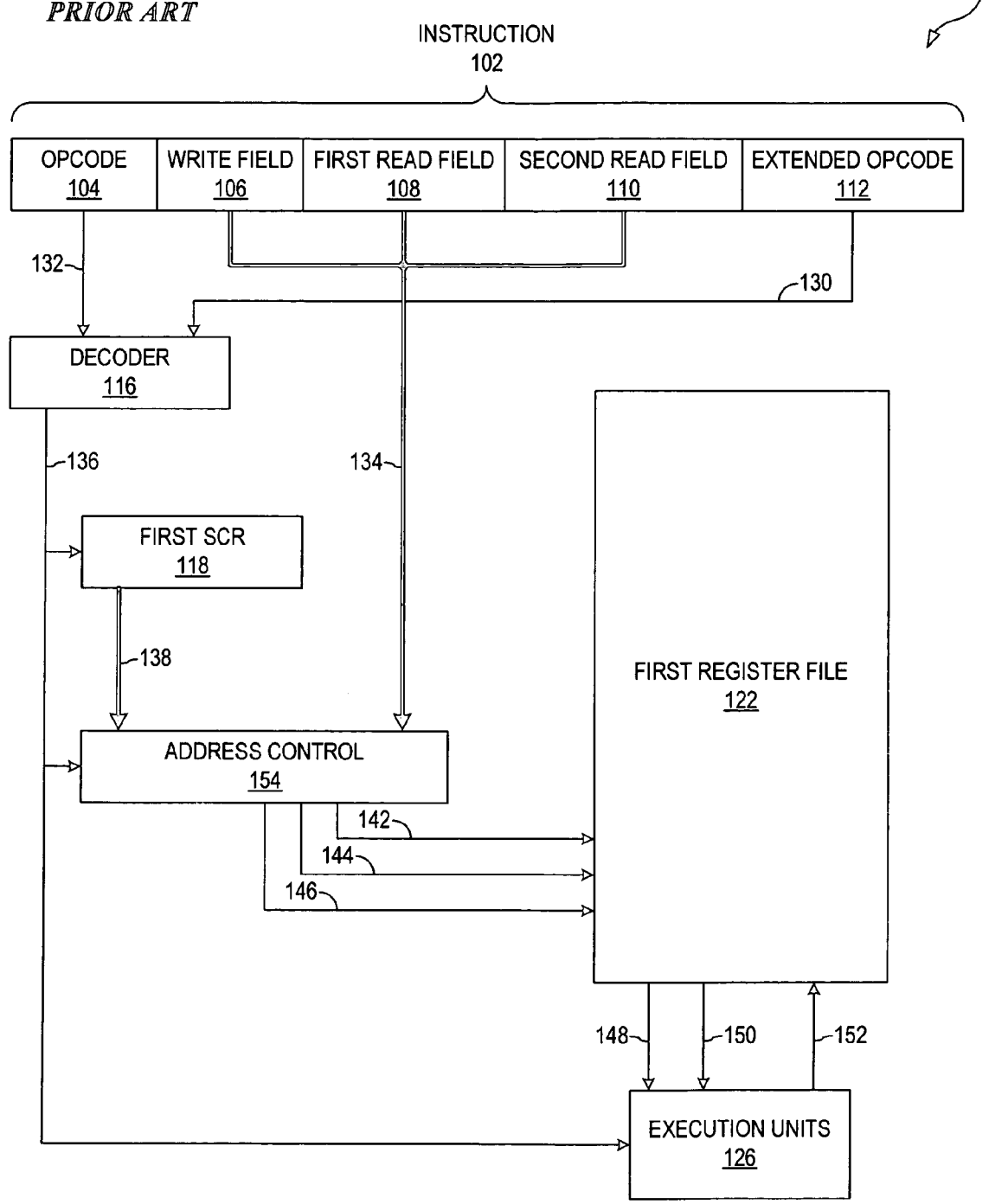
FIG. 1 is a block diagram depicting a conventional architected register file system for a single thread.

Referring to FIG. 1 of the drawings, the reference numeral 100 generally designates an architected register file system for a single thread. The conventional system 100 comprises an instruction 102, a decoder 116, a register file (RF) 122, a Status and Control. Register (SCR) 118, an address control 154, and execution units 126. The instruction 102 carries all of the data needed for an execution. The instruction 102 comprises an operations code (OPCODE) field 104, a first write field 106, a first read field 108, a second read field 110, and an extended OPCODE field 112. The OPCODE field 104 is the desired operation or operations for the instruction, such as add, subtract, and so forth. The first write field 106 is an address location to which the result of the desired operation is to be stored. The first read field 108 is an address location within a register, such as the RF 122, from which data can be read for a given operation. The second read field 110 is an address location within a register, such as the first RF 122, from which data can be read for a given operation. The extended OPCODE field 112 is an overflow field for operational code data. Additionally, there can be multiple write fields or a single write field, as shown in FIG. 1. Also, there can be a single read field or multiple write fields, as shown in FIG. 1.

Once the instruction 102 has been communicated, operations on data are performed. In the conventional system 100, the operational thread that is utilizing the conventional system 100 is capable of writing to the one RF 122. In other words, data can be read from and written to the RF 122 and no other RF. Therefore, for each thread, there is a dedicated RF 122 and a dedicated SCR 118. If the conventional system 100 were expanded to multiple threads, though, a single decoder 116, an execution units 126, and an address control 154 may only be necessary; however, multiple decoders, multiple execution units, and multiple address controls can be used.

The conventional system 100 begins operation by first communicating data from the instruction 102 to various modules in the conventional system 100. The operation code datum from the OPCODE field 104 and the extended OPCODE field are transmitted to the decoder 116 through a first communication channel 132 and a second communication channel 130, respectively. The data from the write 106, the first read field 108, and the second read field are transmitted to the address control 154 through a third communication channel 134. Also, the data from each of the read and write fields can be transmitted through a multiple communication channels, as shown in FIG. 1.

Once the initial data from the instruction 102 has been communicated to the various components of the conventional system 100, then operations can be performed. The decoder 116 decodes operational data to determine the specific operations to be performed, such as addition and subtraction of certain register entries. The decoder 116 then transmits the decoded data to the SCR 118, the address control 154, and the execution units 126 through a fifth communication channel 136. Also, there can be multiple communication channels or a single communication channel, as shown in FIG. 1, for communication decoded data. The SCR 118 utilizes the decoded data to account for, monitor, and controls the status of the register entries. The SCR 118 maintains control and status through transmitting control and status data to the address control 154 through a sixth communication channel 138.

The address control 154 then can utilizes read field data, write field data, and status and control to assist in performing desired operations. From all of the data received, the address control 154 is able to determine the real addresses of register entries for reads and writes. That way, the address control 154 is capable of recalling data from a desired entry location and writing to a desired entry location. Enablement signals for a read of a first registry entry and a second registry entry of the RF 122 are communicated through a seventh communication channel 142 and an eighth communication channel 144, respectively. An enablement signal for a write to a register entry is communicated to the RF 122 through a ninth communication channel 146. Additionally, with the read addresses for reads and writes provided by the address controller 154, the execution units 126 can then receive data from read entries from the RF 122 through a tenth communication channel 148 and an eleventh communication channel 150. The execution units 126 can then perform the operation desired operation, such as addition and subtraction, and transmit the resultant data to the write entry location of the RF 122 through a twelfth communication channel 152.

Figure 2:
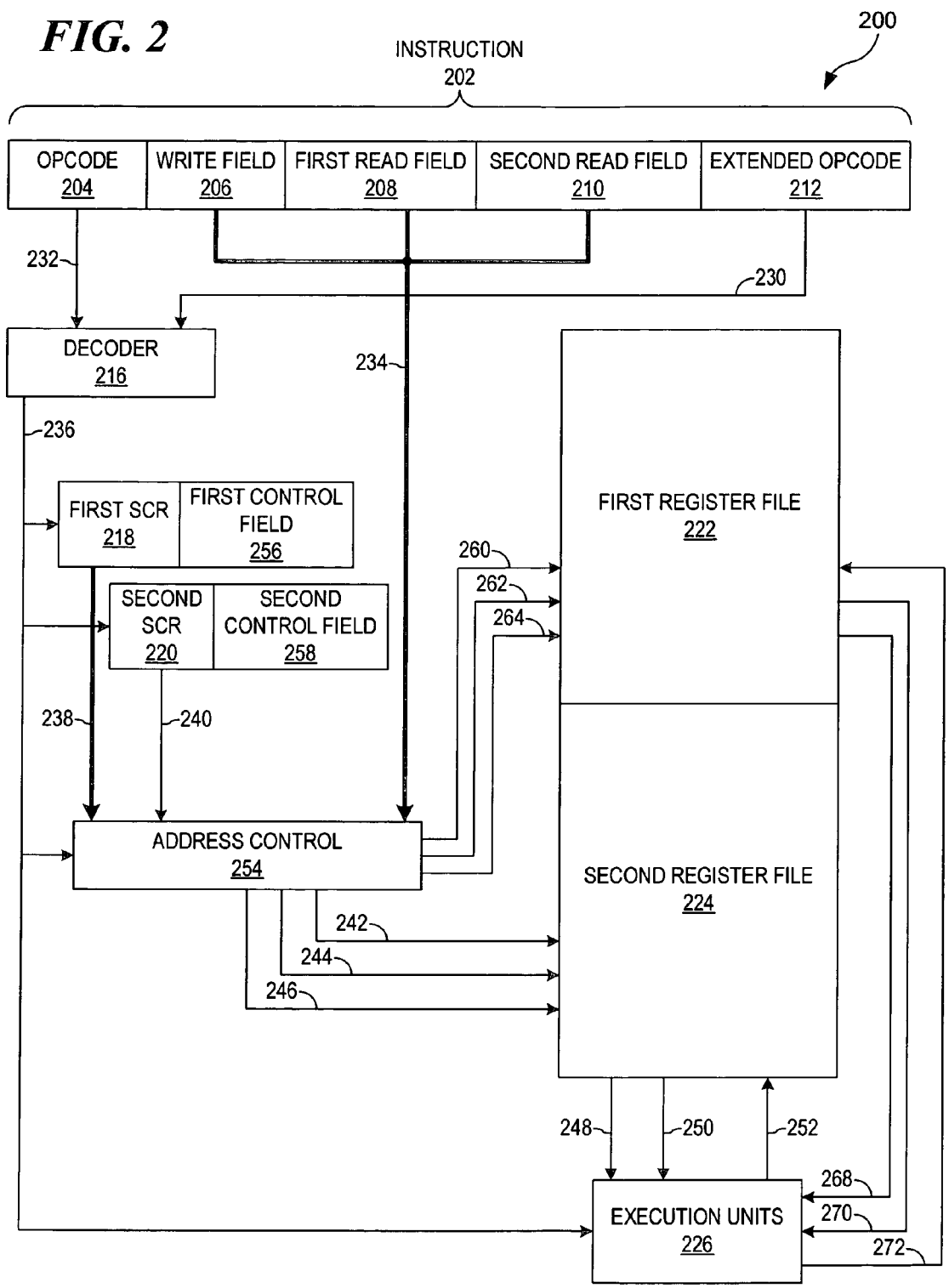
FIG. 2 is a block diagram depicting a modified architected register file system.

Referring to FIG. 2 of the drawings, the reference numeral 200 generally designates a modified architected register file system. The modified system 200 comprises an instruction 202, a decoder 216, a first RF 222, a second RF 224, a first SCR 218, a second SCR 220, an address control 254, and execution units 226.

The instruction 202 carries all of the data needed for an execution. The instruction 202 comprises an operations code (OPCODE) field 204, a first write field 206, a first read field 208, a second read field 210, and an extended OPCODE field 212. The OPCODE field 204 is the desired operation or operations for the instruction, such as add, subtract, and so forth. The first write field 206 is an address location to which the result of the desired operation is to be stored. The first read field 208 is an address location within a register, such as the first RF 222 and the second RF 224, from which data can be read for a given operation. The second read field 210 is an address location within a register, such as the first RF 222 and the second RF 224, from which data can be read for a given operation. The extended OPCODE field 212 is overflow field for operational code data. Additionally, there can be multiple write fields or a single write field, as shown in FIG. 2. Also, there can be a single read field or multiple write fields, as shown in FIG. 2.

In the modified system 200, the operational threads that are utilizing the modified system 200 are capable of reading or writing to either RF. In other words, for a given thread, data can be read from and written to the first RF 222 and the second RF 224. In order to expand the capabilities of a conventional system, such as the conventional system 100 of FIG. 1, the SCRs for each thread are modified. Each of the first SCR 218 for a first thread and the second SCR 220 for a second thread, each have additional bits. The first SCR 218 is accompanied by a first control field 256, and the second SCR 220 is accompanied by a second control field 258. The first control field 256 and the second control field 258 enable or disable the first or second threads, respectively, from read, writing, or both to either the first RF 222 or the second RF 224. Moreover, there can be multiple bits comprising a control field or a single bit, as shown in FIG. 2.

As an example, assuming that each of the first control field 256 and the second control field 258 each further comprise bit pairs, a utilization scheme can be built. The first bit of each pair is the read bit, and the second bit of each pair is a write bit. When the first bit is disabled or "0," then the architected register only allows a current thread associated with the first bit to read from the current thread's RF. Conversely, if the first bit is enabled or "1," then the architected register only allows a current thread associated with the first bit to read from the other thread's RF. Also, when the second bit is disabled or "0," then the architected register only allows a current thread associated with the first bit to write to the current thread's RF. Conversely, if the second bit is enabled or "1," then the architected register only allows a current thread associated with the first bit to write to the other thread's RF. Hence, the ability of a thread to utilize the entire architected registry is expanded.

In order for the modified system 200 to function through, data must be intercommunicated through various components. The modified system 200 begins operation by first communicating data from the instruction 202 to various modules in the modified system 200. The operation code datum from the OPCODE field 204 and the extended OPCODE field are transmitted to the decoder 216 through a first communication channel 232 and a second communication channel 230, respectively. The data from the write 206, the first read field 208, and the second read field are transmitted to the address control 254 through a third communication channel 234.

Also, the data from each of the read and write fields can be transmitted through multiple communication channels, as shown in FIG. 2.

Once the initial data from the instruction 202 has been communicated to the various components of the modified system 200, then operations can be performed. The decoder 216 decodes operational data to determine the specific operations to be performed, such as addition and subtraction of certain register entries. The decoder 216 then transmits the decoded data to the first SCR 218, the second SCR 220, the address control 254, and the execution units 226 through a sixth communication channel 236. Also, there can be multiple communication channels or a single communication channel, as shown in FIG. 2, for communication decoded data. The first SCR 218 and the second SCR 220 utilize the decoded data to account for, monitor, and controls the status of the register entries. Additionally, the first control field 256 and the second control field 258, which are directly coupled to the first SCR 218 and the second SCR 220 respectively, assist in determining which RF to operate in or on. The first SCR 218 and the second SCR 220 maintain control and status through transmitting control and status data to the address control 254 through a seventh communication channel 238 and an eight communication channel 240, respectively.

The address control 254 then can utilizes read field data, write field data, and status and control to assist in performing desired operations. From all of the data received, the address control 254 is able to determine the real addresses of register entries for reads and writes, in either the first RF 222 or the second RF 224. That way, the address control 254 is capable of recalling data from a desired entry location and writing to a desired entry location. Enablement signals to the second RF 224 for a read of a first registry entry and a second registry entry are communicated through a ninth communication channel 242 and a tenth communication channel 244, respectively. Enablement signals to the first RF 222 for a read of a first registry entry and a second registry entry are communicated through an eleventh communication channel 260 and a twelfth communication channel 262, respectively. An enablement signal to the second RF 224 for a write to a register entry is communicated through a thirteenth communication channel 246. An enablement signal to the first RF 222 for a write to a register entry is communicated through a fourteenth communication channel 264. Additionally, with the read addresses for reads and writes provided by the address controller 254, the execution units 226 can then receive data from read entries to the second RF 224 through a fifteenth communication channel 248 and a sixteenth communication channel 250.

Also, the execution units 226 can then receive data from read entries to the first RF 222 through a seventeenth communication channel 268 and an eighteenth communication channel 270. Access to each of the registers can be achieved through the same communication channels, as well. The execution units 226 can then perform the desired operation, such as addition and subtraction, and transmit the resultant data to the write entry location to the second RF 224 or to the first RF 222 through a nineteenth communication channel 252 or a twentieth communication channel 272 respectively.

Control fields also can be generalized. The use of control fields associated with a SCR is not restricted to register files. Instead, the control fields may be utilized for floating point registers, fixed point registers, and so forth. Also, the size of the registers can vary. Typically, registers are 32 bits in size; however, there is not preclusion for utilizing any size register desired.

Figure 3:
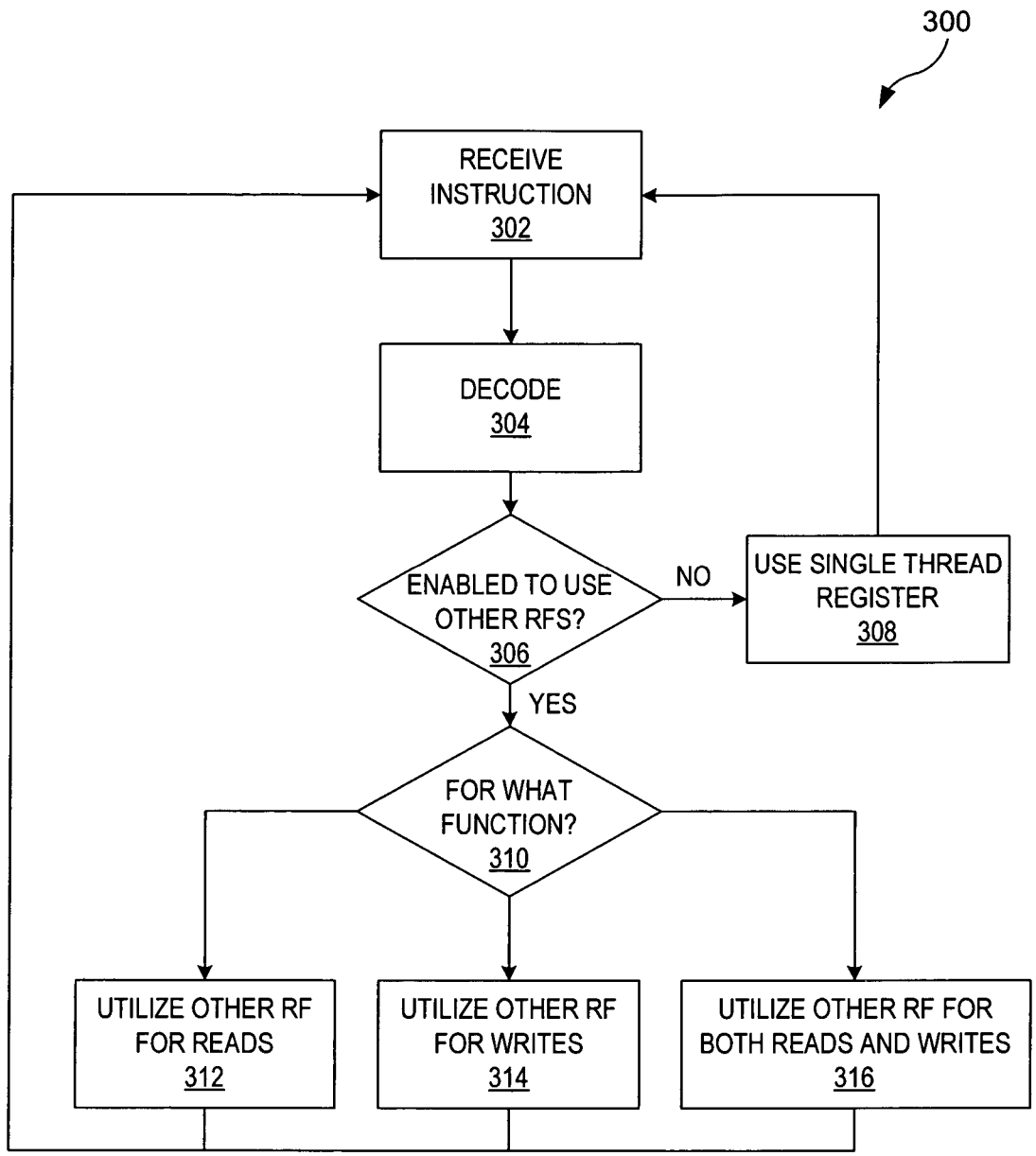
FIG. 3 is a flow chart depicting the modified architected register file system.

Referring to FIG. 3 of the drawings, the reference numeral 300 generally designates a flow chart depicting the modified architected register file system.

The operation of the modified architected register file system initiates with the reception of an instruction in step 302. The instruction received in step 302 is similar to the instruction 202 of FIG. 2. Once received, the instruction is decoded in step 304. The decoding process of step 304 is the determination of the operations defined by the instruction, as illustrated in FIG. 2.

Once the instruction is received and decoded, a determination as to whether other RFs are available is made in step 306. Control fields, such as the first control field 256 and the second control field 258, of FIG. 2 determine whether a thread with the pending instruction is permitted to utilize the VFR of other threads. If the thread with the pending instruction is not permitted to utilize other threads, then the RF assigned to the thread with the pending instruction is utilized in step 308.

However, if the thread with the pending instruction is permitted to utilize other threads, then another set of steps should be employed. A determination of what functions in other RFs should be made in step 310. There are three possibilities: read from other RFs, write to other RFs, or both. In step 312, the thread can read from whatever RF that is enabled, and in step 314, the thread can write to whatever RF is enabled. Also, in step 316, the thread can read or write to whatever RF is enabled. Moreover, there can be an enable/disable for read, write, or both for each RF that may be available.

A reason for allowing a scheme of reading, writing, or both of other RF is to better utilize limited resources. As pipelines become deeper, more architected RFs are needed. In a conventional system, a thread can only utilize its own RF. In a modified system, a thread can not only utilize its own RFs, but also the RFs of other threads, potentially doubling the number of architected registers.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. An architected register file system at least configured to utilize a plurality of threads, comprising:
   a plurality of register files, wherein each register file of the plurality of register files at least corresponds to a respective thread of the plurality of threads;
   a plurality of Status and Control Registers (SCR), wherein each SCR corresponds to a respective thread of the plurality of threads; and a plurality of control bit sets, wherein each control bit set corresponds to at least one SCR, and wherein each control bit set is at least configured to allow a thread associated with an associated SCR to utilize other register files associated with other threads.

2. The architected register file system of claim 1, wherein the architected register file system further comprises a decoder, wherein the decoder at least determines desired operations for an instruction.

3. The architected register file system of claim 1, wherein plurality of control bits further comprise a plurality of bit doublets, wherein a first bit of a bit doublet corresponds to a read function, and wherein a second bit of the bit doublet corresponds to a write function.

4. The architected register file system of claim 3, wherein the architected register file system further comprises:
   an address control, wherein the address control at least determines addresses with the plurality of register files; and
   at least one execution unit, wherein the execution is at least configured to perform the operations of a input instruction within the plurality of register files.

5. The architected register file system of claim 3, wherein the plurality of bit doublets further comprises that each bit doublet at least corresponds to enabling the use of at least one register file associated with another thread.

6. The architected register file system of claim 5, wherein each bit doublet of the plurality of bit doublets further comprises:
   at least one bit is at least configured to correspond to a read function, wherein a logic high or '1' enables the first thread to read from another register file; and
   at least one bit is at least configure to correspond to a write function, wherein a logic high or '1' enables the first thread to write to another register.

7. A method for utilizing a plurality of register files with associated SCRs in a multithread system, wherein each register file is at least associated with one thread of a plurality of threads, comprising:
   receiving an instruction for a first thread of the plurality of threads, wherein the first thread is at least associated with a first SCR;
   decoding the instruction to at least determine performance operations;
   determining if the first thread is enabled to at least utilize register files associated with other threads; and
   executing the instruction, wherein the step of executing utilizes at least one register file associated with a second thread of the plurality of threads.

8. The method of claim 7, wherein the step of determining if the first thread is enabled, further comprises measuring logical levels of control bits associated with the first SCR, wherein the control bits comprise a plurality of bit doublets, and wherein each bit doublet at least corresponds to enabling the use of at least one register file associated with another thread.

9. The method of claim 8, wherein the step of measuring further comprises determining if any bits are '1' or logic high, wherein the '1' or the logic high enables the first thread to read or write to another register file.

10. A method for utilizing a plurality of register files in a multithread system, the method comprising:
    receiving an instruction for a first thread having an operations code field, a write field, and one or more read fields, wherein the operations code field defines a desired operation for the instruction, wherein the write field defines an address location to which a result of the operation is to be stored, and wherein the at least one read field defines an address location from which data is to be read for the operation;
    decoding the instruction;
    setting a first status and control register associated with the first thread and a second status and control register associated with a second thread based on the decoding of the instruction, wherein a first register file is associated with the first thread and a second register file is associated with the second thread;
    determining whether the first thread is permitted to utilize the second register file associated with the second thread based on at least one of the first status and control register or the second status and control register; and
    if the first thread is permitted to utilize the second register file, performing the operation utilizing the second register file by writing to or reading from the second register file associated with the second thread.

11. The method of claim 10, wherein performing the operation comprises:
    reading data from the second register file based on an address in a read field within the one or more read fields.

12. The method of claim 10, wherein performing the operation comprises:
    writing a result of the operation to the second register file based on an address in the write field.

13. An apparatus for utilizing a plurality of register files in a multithread system, the apparatus comprising:
    a decoder that receives and decodes an instruction for a first thread having an operations code field, a write field, and one or more read fields, wherein the operations code field defines a desired operation for the instruction, wherein the write field defines an address location to which a result of the operation is to be stored, and wherein the at least one read field defines an address location from which data is to be read for the operation;
    a first status and control register associated with the first thread;
    a first register file associated with the first thread;
    a second status and control register associated with a second thread;
    a second register file associated with the second thread, wherein the decoder sets the first status and control register and the second status and control register based on the decoding of the instruction, wherein a first register file is associated with the first thread and a second register file is associated with the second thread;
    an address control that enables or disables access to the first register file and the second register file based on the first status and control register and the second status and control register, wherein the address control enables the first thread to access the second register file if the first thread is permitted to utilize the second register file; and
    one or more execution units that perform the operation utilizing the second register file by writing to or reading from the second register file associated with the second thread based on the address control.

14. The apparatus of claim 13, wherein the first status and control register comprises a first control field that indicates whether to enable reading from the second register file.

15. The apparatus of claim 14, wherein the first status and control register comprises a second control field that indicates whether to enable writing to the second register file.

* * * * *